(12) United States Patent
Huthwohl et al.

(10) Patent No.: US 7,244,285 B2
(45) Date of Patent: Jul. 17, 2007

(54) FILTER BODY FOR PARTICLE FILTER

(75) Inventors: Georg Huthwohl, Soest (DE); Thomas Kastner, Dortmund (DE); Carsten Kohberg, Menden (DE); Peter Neumann, Menden (DE); Rene Redondo, Remscheid (DE)

(73) Assignee: Purem Abgassysyteme GmbH & Co. KG, Unna (DE)

( * ) Notice: Subject to any disclaimer, the term of this patent is extended or adjusted under 35 U.S.C. 154(b) by 372 days.

(21) Appl. No.: 10/889,566

(22) Filed: Jul. 12, 2004

(65) Prior Publication Data

US 2005/0005598 A1 Jan. 13, 2005

(30) Foreign Application Priority Data

Jul. 11, 2003 (DE) ................. 103 31 347

(51) Int. Cl.
*B01D 46/00* (2006.01)
(52) U.S. Cl. ................. 55/525; 55/DIG. 30
(58) Field of Classification Search ........... 55/482,
55/381.5, 385.3, 483, 485, 490, 495, 497,
55/498, 502, 505, 510, 511, 523, 524, 525,
55/DIG. 30, 486, 522; 60/311, 323, 324;
95/273, 285; 96/390, 392, 10; 210/510.1,
210/503, 498, 499, 493.1, 494.2
See application file for complete search history.

(56) References Cited

U.S. PATENT DOCUMENTS 3,581,902 A * 6/1971 Bidler ................. 210/347
4,637,877 A * 1/1987 Hartmann et al. .......... 55/523
5,100,551 A * 3/1992 Pall et al. .................. 55/523
5,215,724 A * 6/1993 Haerle ...................... 55/329
5,944,859 A 8/1999 Lippert et al.
2003/0038088 A1 2/2003 Denys et al.
2003/0187539 A1* 10/2003 Smith ...................... 700/145
2004/0128988 A1* 7/2004 Frankle et al. ............. 60/297
2006/0144900 A1* 7/2006 Hirth et al. ................ 228/30

FOREIGN PATENT DOCUMENTS

| DE | 0331885 B1 | 8/1999 |
|---|---|---|
| DE | 10128938 | 1/2003 |
| DE | 10128938 A1 | 1/2003 |
| DE | 04015572.3-1213 | 11/2004 |
| WO | WO 02/102492 A1 | 12/2002 |

* cited by examiner

*Primary Examiner*—Duane Smith
*Assistant Examiner*—Robert Clemente
(74) *Attorney, Agent, or Firm*—Margaret Polson; Patent Law Offices of Rick Martin, PC

(57) ABSTRACT

In a filter body for a particle filter with a filter part, comprised of a gas-permeable support material coated with a sintered metal powder, and with a connection part connected with the filter part and provided for welding together with a holding element, the filter part and the connection part together form a closed volume and the connection part is comprised of a gas-impermeable material.

15 Claims, 1 Drawing Sheet

FILTER BODY FOR PARTICLE FILTER

CROSS REFERENCE APPLICATIONS

This application claims priority from German application no. 103 31 347.8 filed Jul. 11, 2003.

FIELD OF INVENTION

The present invention relates to a filter body for a particle filter for the elimination of particles contained in an exhaust gas stream, in particular in an exhaust gas system of an internal combustion engine. The filter body has a filter part and a connection part connected to the filter part. The invention furthermore relates to a particle filter and a method for the production of a filter body for a particle filter.

BACKGROUND OF THE INVENTION

Particle filters for exhaust gas systems of internal combustion engines are well known.

EP 0 331 885 B1 describes an exhaust gas filter for eliminating noxious components of exhaust gases, which comprises a filter body of a high temperature-resistant sintered material with a multiplicity of inlet and outlet channels.

DE 101 28 938 A1 discloses a particle filter comprising several filter bodies and the exhaust gas stream is purified during the inflow into the filter bodies comprised of sintered metal or coated with sintered metal powder.

One problem encountered in the production of such filter bodies for particle filters is the connection of the filter bodies with a holding element, on which several filter bodies are disposed to form the particle filter. If the material of the filter body is welded with the holding element, problems are regularly encountered with the long fatigue strength of such a welded connection. Moreover, in that region of the filter body to be attached to the holding element requires a high degree of deformation, which leads to difficulties in the porous gas-permeable material.

The present invention therefore addresses the problem of providing a filter body for a particle filter with a simple connection of several filter bodies with a holding element.

SUMMARY OF THE INVENTION

The primary aspect of the present invention is to provide a filter body for a particle filter with a simple connection of several filter bodies with a holding element.

The filter part is comprised of a gas-permeable support material coated with a sintered metal powder which ensures the filter action of the filter body by making possible the deposition of particles on the same. The connection part is comprised of a deformable gas-impermeable material and makes possible the simple connection of the filter body with a holding element or the like. Since the connection part is comprised of a different material more readily deformed than the filter part, the connection part can be provided with a geometric shape with significantly lower expenditures. The geometric shape allows the connection parts to be sealed against one another if they are disposed in a particle filter.

The function of the filter body is ensured when the filter part and the connection part together form a volume into which the exhaust gas stream flows. The exhaust gas stream is filtered and then exits the volume again.

In a first embodiment of the invention the filter part and the connection part are two separate structural parts connected by welding. This embodiment still requires that the support material be welded to the connection part, however this embodiment has a much larger surface area for this purpose than was available with the prior art connections. Therefore, considerably fewer difficulties are expected when welding the connection part to the filter part.

In a second embodiment the filter part and the connection part are developed of an integral material. This embodiment has the advantage that it is not required to connect the connection part and the filter part. It is only necessary to ensure that the filter part is gas-permeable and coated with a sintered metal powder, and that the connection part is comprised of a formable gas-impermeable material. In the second embodiment the connection part and the filter part can be formed of an integral expanded sheet metal with expanded regions and non-expanded regions. The expanded regions of the expanded sheet metal form the filter part and the nonexpanded regions of the expanded sheet metal form the connection part.

It is also optionally possible to implement the filter material only in the proximity of the deformation such that a deformation is attained in the region of the head of the filter body without tearing open the filter area.

A particle filter for eliminating particles contained in an exhaust gas stream, in particular in an exhaust gas system of an internal combustion engine, with several filter bodies one disposed next to the other is also disclosed.

Other aspects of this invention will appear from the following description and appended claims, reference being made to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
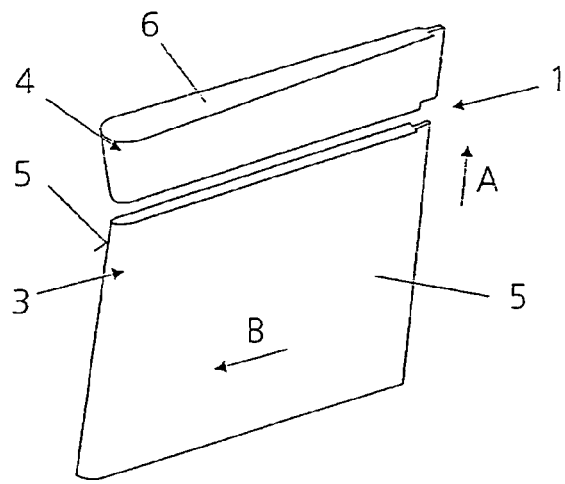
FIG. 1 is a perspective view of a first embodiment of the filter body according to the invention.
Figure 4:
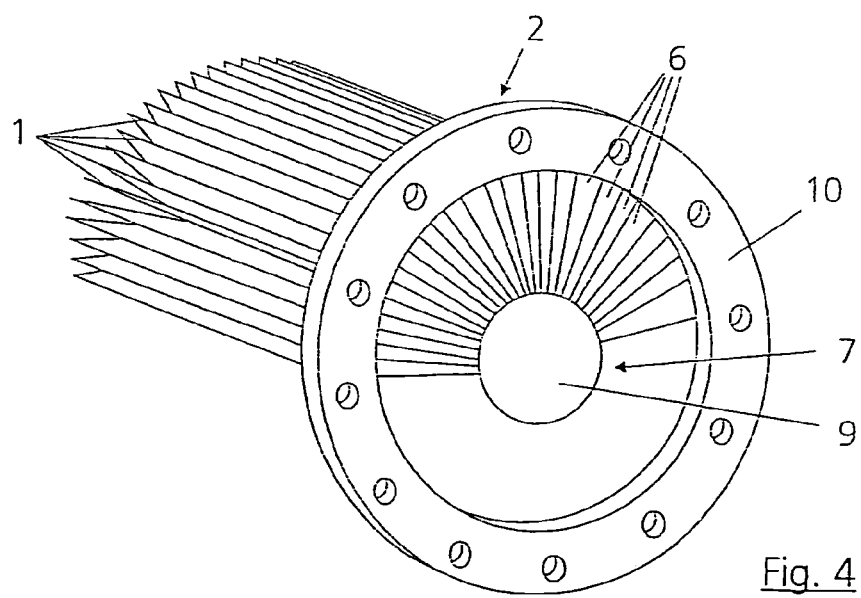
FIG. 4 is a perspective view of a particle filter with several filter bodies developed according to the invention.

FIG. 1 shows a filter body 1 for a particle filter 2 depicted in FIG. 4. The particle filter 2 is provided for the elimination of particles contained in an exhaust gas stream, in particular in an exhaust gas system of an internal combustion engine. Neither the internal combustion engine nor its exhaust gas system are depicted in any of the figures.

The filter body 1 comprises a filter part 3 and a head part or connection part 4, which together form a volume. The filter part 3 has two side walls 5, which extend substantially parallel to one another in the longitudinal direction denoted by arrow A of the filter body 1 and in the transverse direction denoted by arrow B of the filter body 1. In the direction of arrow B filter part 3 has a minimal conicity, with the exception of the lower termination edge. The transverse direction also has a minimal conicity, in consequently filter part 3 has an approximately rectangular cross section shape.

The filter part 3 is comprised of a gas-permeable support material, for example a woven wire cloth, coated with a sintered metal powder. When coating with the sintered metal powder the voids the woven wire cloth are filled. Due to the porosity of the filter part 3, the exhaust gas can flow through the sidewalls 5 into the filter body 1 and into the volume formed by the filter part 3 and the connection part 4. The exhaust gas can leave filter body 1 at an axial opening 6 of the connection part 4, which extends over the entire cross section of the connection part 4.

Due to the coating with the sintered metal powder, the sidewalls 5 perform the purification action by filtering out particles in the exhaust gas stream. It is understood that it is possible to reverse the direction of flow from the described preferred direction of flow.

Figure 2:
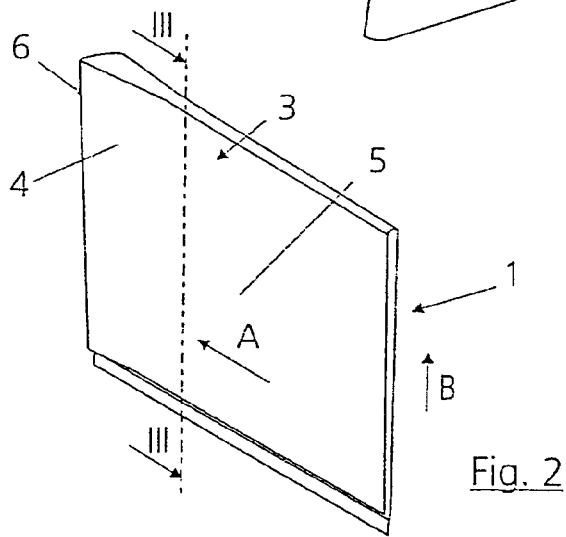
FIG. 2 is a perspective view of a second embodiment of the filter body according to the invention.

The connection part 4 of the first embodiment shown in FIG. 1 is a structural part separate from the filter part 3 which are welded together in use. FIG. 1 shows the connection part 4 not yet connected with the filter part 3. In order to be able to weld the connection part 4, and consequently the filter body 1, with a holding element 7 of the particle filter 2, as shown in FIG. 4, the connection part 4 is preferably comprised of a gas-impermeable material with a substantially smooth surface, preferably a temperature-resistant sheet metal. In the alternative, the filter part 3 and the connection part 4 can be developed integrally of expanded metal, as shown in FIG. 2. In cross section the connection part 4 has the form of a wedge, whose function will be explained in further detail with reference to FIG. 4.

The filter body 1 according to FIG. 1 can be produced in the following manner: first, the gas-permeable support material is coated with the sintered metal powder and subsequently reshaped into the filter part 3. In spite of the above described porosity of the filter part 3, no damage occurs during this reshaping. The filter part 3 acquires at its lower side a longitudinal seam, which can be welded. Instead of a complete reshaping, the two sidewalls 5 can also be welded together at two edges. The connection part 4 is formed from the gas-impermeable material and the filter part 3 and the connection part 4 are subsequently connected with one another by welding or other suitable means.

In FIG. 2 an alternative embodiment of the filter body 1 is shown in a position rotated by 90° compared to FIG. 1. The filter part 3 and the connection part 4 are formed of an integral expanded sheet metal, which consists of expanded regions, which are gas permeable, and non-expanded regions, which are gas-impermeable. The expanded regions form the filter part 3 and the non-expanded regions form the connection part 4. The term expanded metal and the method employed for the production of the same are generally known to a person skilled in the art and for that reason it is not necessary to explain these further.

The filter body 1 according to FIG. 2 can be produced in the following manner: The expanded sheet metal is first provided with expanded regions having voids and non-expanded regions without voids. Then the expanded regions are coated with the sintered metal powder and sintered. Subsequently the expanded sheet metal is reshaped into the filter body 1 with the expanded regions forming the filter part 3 and the non-expanded regions the connection part 4. The connection part 4 is connected with the holding element 7 for connecting the filter part 3. The sintered metal powder is automatically deposited at the voids of the expanded regions during the coating of the expanded sheet metal and, in contrast, cannot become deposited on the non-expanded regions, since there are no voids here.

In both embodiments of the filter body 1 the transition from the rectangular shape of the filter part 3 to the wedge shape of the connection part 4 is carried out smoothly and can extend over a relatively long region of the connection part 4, to facilitate the above described reshaping processes.

Figure 3:
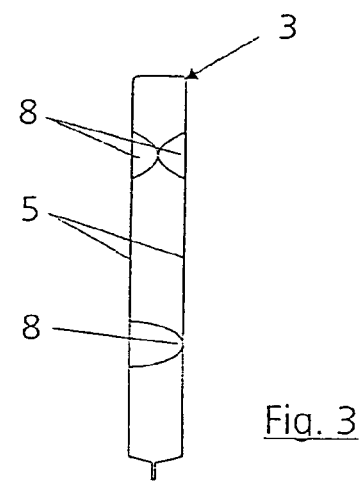
FIG. 3 cross sectional view of a section along line III-III of FIG. 2.

FIG. 3 shows a section through the filter part 3 of the filter body 1 from FIG. 2. A section through the filter body 1 of FIG. 1 could have a similar or even identical appearance, since there are no significant geometric differences between the filter part 3 of FIG. 1 and that of FIG. 2. This also applies to the connection part 4. In the interior of the filter part 3 spacer elements 8 can be seen disposed on the side walls 5, which ensure that the exhaust gas pressure cannot press the side walls 5 together and consequently reduce the volume within the filter body 1. This ensures a satisfactory volume within the filter body 1 is always secured and the stability of the same is ensured.

The spacer elements 8 can either have opposing spacer elements 8 in contact with one another or can be in contact with the particular opposing sidewall 5. Both examples are depicted in FIG. 3. In the present case the spacer elements 8 are developed as knobs. However, the spacers can also be webs or ribs extending in the longitudinal and/or transverse direction of sidewalls 5. Such webs or ribs, not shown, can be implemented as axially extending embossments or beads in one of the sidewalls 5, with the knobs of the opposing sidewall 5 contacting such a bead, for example.

FIG. 4 depicts the particle filter 2 comprised of several filter bodies 1 disposed radially one next to the other. The filter bodies 1 are disposed on one side on a closure or sealing element 9 and on the opposing side on an outer ring 10. Consequently the outer ring 10 forms the holding element 7 on which several filter bodies 1 can be held for forming the particle filter 2. Due to their shape, the filter bodies 1 sustain themselves in their interior region. To attain greater rigidity of the particle filter 2 a similar structural part can be disposed on the opposite side of the outer ring 10.

FIG. 4 also shows that the filter bodies 1 on the side opposite to the outer ring 10 are spaced apart from one another in the circumferential direction, such that the exhaust gas stream can flow without problems in between the individual filter bodies 1 and ash and other particles can collect in the generated interspaces. However, as already described above the connection parts 4 are widened or have a wedge form, such that on that side of the particle filter 2 on which the sealing element 9 and the outer ring 10 are located the exhaust gas stream is prevented from flowing between two filter bodies 1. This forces the exhaust gas stream to flow into the filter parts 3 and to leave the filter bodies 1 through the openings 6 of the connection parts 4, which ensures high purification action of the particle filters 2. The sealing element 9 consequently blocks off the gas path and prevents the gas from escaping at a site different from the openings 6.

To increase the imperviousness in this outlet region of the particle filter 2, the connection parts 4 are welded to one another in addition to the sealing element 9 and the outer ring 10. For this purpose corresponding recesses (not shown) can be disposed on the outer ring 10 to ensure corresponding guidance for the connection parts 4. The filter bodies 1 can also have corresponding recesses for the connection with the outer ring 10. In this context, laser welding is a suitable welding method. However, it is understood that WIG welding, rolled-seam welding or another welding method can also be suitable.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

We claim:

1. A filter body for a particle filter for eliminating particles contained in an exhaust gas stream, in particular in an exhaust system of an internal combustion engine, wherein said filter body has an elongated shaped and an open end piece arranged at one end of a longitudinal extension and wherein said filter body is formed of an expanded metal sheet with an expanded region forming a filter part and a non-expanded region forming the open end piece of said filter body.

2. The filter body as claimed in claim 1, wherein the end piece of said filter body is developed as a connection part adapted to be welded to a holding element.

3. The filter body as claimed in claims 1 or 2, wherein the expanded region is coated with sintered metal powder.

4. The filter body as claimed claim 1, wherein the filter part further comprises two side walls extending substantially parallel to one another in at least one of a longitudinal and a transverse direction of the filter body.

5. The filter body as claimed in claim 4, wherein spacer elements are disposed within the filter part between the side walls.

6. The filter body as claimed in claim 5, wherein spacer elements are provided which are in contact with one another.

7. The filter body as claimed in claim 1, wherein the body, exhibits a conicity in at least one of a longitudinal and a transverse direction.

8. The filter body as claimed in claim 2, wherein the connection part in wedge shaped.

9. A particle filter for eliminating particles contained in an exhaust gas stream, in particular in an exhaust gas system of an internal combustion engine, said particle filter comprising:

two or more filter bodies disposed one next to the other, wherein said filter body has an elongated shaped and an open end piece arranged at one end of a longitudinal extension; and wherein said filter bodies are formed of an expanded metal sheet with an expanded region forming a filter part and a non-expanded region forming the open end piece of a respective filter body.

10. A particle filter as in claim 9, wherein the end piece of a respective filter body is developed as a connection part adapted to be welded to a holding element.

11. The particle filter as claimed in one of claims 9 or 10, wherein the filter bodies are disposed radially on an outer ring functioning as a holding element and a gas path is blocked off by means of a sealing element.

12. The particle filter as claimed in claim 10, wherein the connection parts of the filter bodies are welded to one another.

13. The particle filter as claimed in claim 11, wherein the filter bodies are spaced apart from one another in the circumferential direction.

14. The particle filter as claimed in claim 11, wherein the connection parts of the filter bodies are welded to the outer ring.

15. A method for the production of a filter body for a particle filter for eliminating particles contained in an exhaust gas stream, in particular in an exhaust gas system of an internal combustion engine, comprising the steps of:

providing an expanded sheet metal having expanded regions and non-expanded regions;

coating the expanded regions with a sintered metal powder; and reshaping the expanded sheet metal into an elongated filter body with the expanded regions forming a filter part and the non-expanded regions forming an open end piece of said filter body.

* * * * *